United States Patent
Lee et al.

(10) Patent No.: US 9,126,393 B2
(45) Date of Patent: Sep. 8, 2015

(54) BONDING APPARATUS AND METHOD OF BONDING COMPONENT ON SUBSTRATE USING THE SAME

(71) Applicant: Samsung Display Co., Ltd., Yongin, Gyeonggi-Do (KR)

(72) Inventors: Min-Woo Lee, Seoul (KR); Nakcho Choi, Hwaseong-si (KR); Daeho Song, Hwaseong-si (KR); WooJae Lee, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/844,801

(22) Filed: Mar. 16, 2013

(65) Prior Publication Data

US 2014/0110047 A1   Apr. 24, 2014

(30) Foreign Application Priority Data

Oct. 24, 2012   (KR) .................. 10-2012-0118502

(51) Int. Cl.
*B32B 37/10*   (2006.01)
*B32B 38/18*   (2006.01)

(52) U.S. Cl.
CPC ............ *B32B 37/10* (2013.01); *B32B 38/1841* (2013.01); *B32B 38/1858* (2013.01); *B32B 2307/546* (2013.01); *B32B 2457/20* (2013.01); *Y10T 156/10* (2015.01); *Y10T 156/1744* (2015.01)

(58) Field of Classification Search
CPC ............ H01L 21/6835; H01L 21/6838; H01L 21/683; H01L 21/687; H01L 2224/95144; H01L 2224/75733; H01L 2224/75743; B29K 2023/06; B29K 2027/06; B29K 2067/003; B29K 2075/00; B29K 2105/0079; B32B 37/0007; B32B 37/003; B32B 37/1284; B32B 2037/0061; B32B 2313/04; B32B 2429/02; B32B 37/0053; B32B 37/226
USPC ........... 156/273.3, 379.8, 556, 285, 391, 582, 156/566, 583, 583.1, 547, 538, 446, 576, 156/139; 29/832, 744, 740, 739, 743
See application file for complete search history.

(56) References Cited

U.S. PATENT DOCUMENTS

| | | | |
|---|---|---|---|
| 5,351,872 A * | 10/1994 | Kobayashi | ............... 228/6.2 |
| 6,656,772 B2 | 12/2003 | Huang | |
| 7,653,989 B2 | 2/2010 | Murata et al. | |

(Continued)

FOREIGN PATENT DOCUMENTS

| | | |
|---|---|---|
| JP | 02-135797 | 5/1990 |
| JP | 2001-201727 | 7/2001 |

(Continued)

*Primary Examiner* — Jacob T Minskey
*Assistant Examiner* — Vishal I Patel
(74) *Attorney, Agent, or Firm* — Innovation Counsel LLP

(57) ABSTRACT

A bonding apparatus configured to bond a component on a substrate is presented. The apparatus includes a stage, a push member, a support member and a compression member. The stage fixes the substrate in place and by using at least one first suction part formed in the stage. The push member is disposed above the stage and pushes the substrate fixed to the stage to support the substrate on the stage. At least one second suction part is formed in the support member to attach to a pad part of the substrate. The compression member compresses the component into the pad part fixed to the support member.

11 Claims, 7 Drawing Sheets

(56) References Cited

U.S. PATENT DOCUMENTS

| | | | |
|---|---|---|---|
| 2003/0033034 A1* | 2/2003 | Tsuji et al. | 700/59 |
| 2004/0060666 A1* | 4/2004 | Nishino et al. | 156/580 |
| 2006/0108045 A1 | 5/2006 | Nakanishi | |
| 2008/0193262 A1* | 8/2008 | Tsuji et al. | 414/222.01 |
| 2008/0301932 A1* | 12/2008 | Murata et al. | 29/743 |
| 2009/0020229 A1* | 1/2009 | Yoon et al. | 156/350 |
| 2012/0291950 A1* | 11/2012 | Sugiyama et al. | 156/285 |

FOREIGN PATENT DOCUMENTS

| | | |
|---|---|---|
| JP | 2004-279699 | 7/2004 |
| JP | 2005-259729 | 9/2005 |
| JP | 2008-286856 | 11/2008 |
| JP | 2011-033664 | 2/2011 |
| JP | 2011-047984 | 3/2011 |
| KR | 1020110054422 | 5/2011 |

* cited by examiner

BONDING APPARATUS AND METHOD OF BONDING COMPONENT ON SUBSTRATE USING THE SAME

CROSS-REFERENCE TO RELATED APPLICATIONS

This U.S. non-provisional patent application claims priority under 35 U.S.C. §119 of Korean Patent Application No. 10-2012-0118502, filed on Oct. 24, 2012, the entire content of which is hereby incorporated by reference.

BACKGROUND

The inventive concept herein relates to a bonding apparatus and methods of bonding a component on substrate using the apparatus, and more particularly, to a bonding apparatus configured to bond a component to a substrate by compressing the component and a method of bonding a component to a substrate using the bonding apparatus.

Since a flexible display including a flexible substrate can be easily carried and handled without being limited by the rigidity of a conventional display screen, its scope of use is gradually expanding to portable communication device such as an electronic paper.

While the flexibility of a flexible display substrate is often a useful property, the flexible characteristic may be a disadvantage when manufacturing the flexible display. For example, the flexible substrate including a plastic material may be more susceptible to damage during manufacturing, for example from heat exposure or an external force. Thus, manufacturing methods that are tailored to the properties of a flexible display continue to be researched.

SUMMARY

In one aspect, embodiments of the inventive concept provide a bonding apparatus that is configured to bond a component to a substrate. The bonding apparatus includes a stage, a push member, a support member and a compression member. The stage holds the substrate in a fixed position using at least one first suction part formed in the stage. The push member is disposed on the stage and pushes the substrate that is fixed to the stage to support the substrate on the stage. At least one second suction part is formed in the support member to fix to a pad part of the substrate. The compression member compresses the component into the pad part that is fixed to the support member.

In another aspect, embodiments of the inventive concept provide a method of bonding a component to a substrate. The method may include holding the substrate in a fixed position by using a stage; fixing the substrate to the stage using at least one first suction part formed in the stage; supporting the substrate on the stage by pushing the substrate by a push member; providing a pad part of the substrate onto the support member; fixing the pad part to the support member using at least one second suction part formed in the support member; providing the component onto the pad part fixed to the support member; and compressing the component into the pad part using a compression member.

BRIEF DESCRIPTION OF THE FIGURES

Preferred embodiments of the inventive concept will be described below in more detail with reference to the accompanying drawings. The embodiments of the inventive concept may, however, be embodied in different forms and should not be constructed as limited to the embodiments set forth herein. Rather, these embodiments are provided so that this disclosure will be thorough and complete, and will fully convey the scope of the inventive concept to those skilled in the art. Like numbers refer to like elements throughout.

DETAILED DESCRIPTION OF THE EMBODIMENTS

Figure 1:
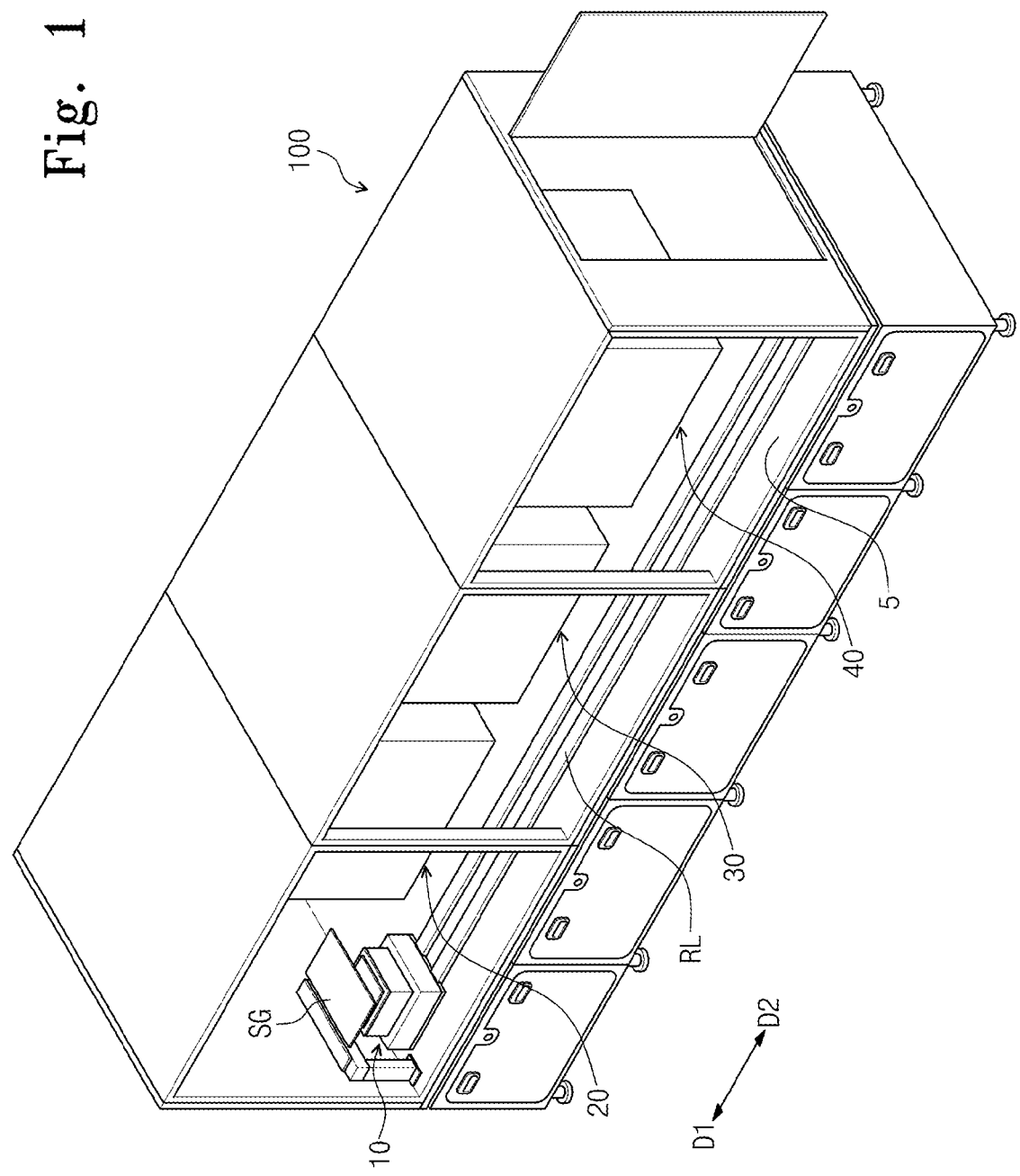
FIG. 1 is a perspective view of a bonding apparatus in accordance with some embodiments of the inventive concept.

Embodiments of inventive concepts will be described more fully hereinafter with reference to the accompanying drawings, in which embodiments of the invention are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

Figure 2:
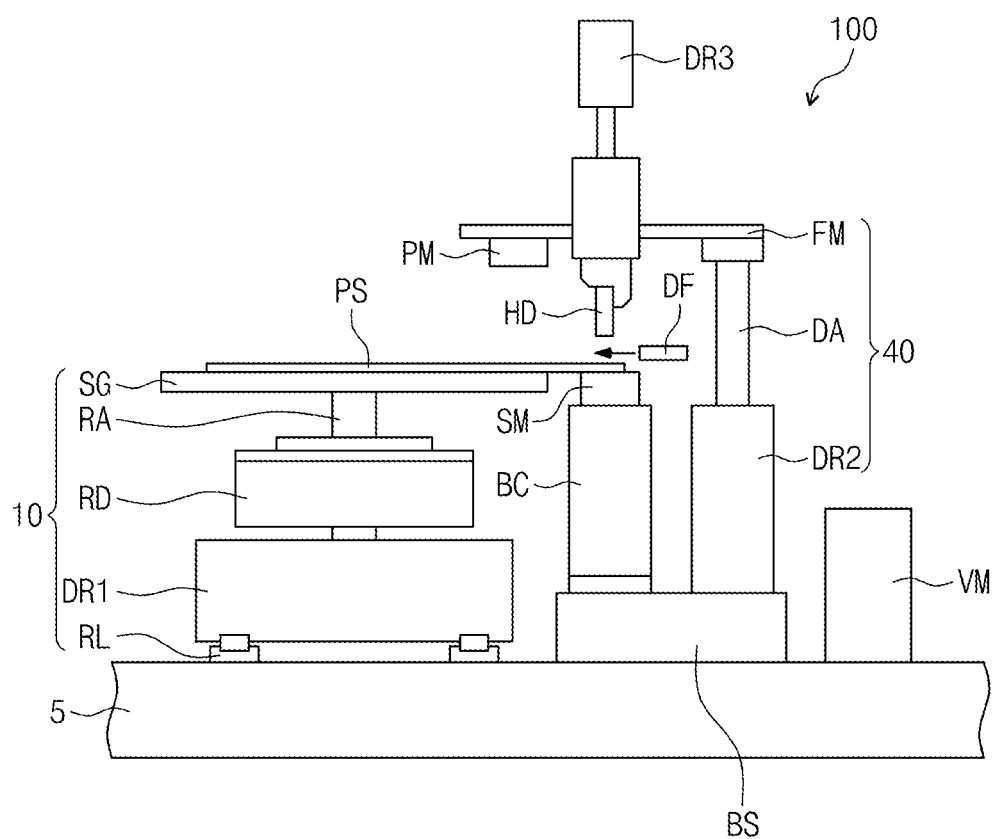
FIG. 2 is a side view of a substrate transfer unit and a main bonding unit.

FIG. 1 is a perspective view of a bonding apparatus in accordance with some embodiments of the inventive concept. FIG. 2 is a side view of a substrate transfer unit and a main bonding unit. More specifically, FIG. 2 depicts a substrate transfer unit after it moved to the main bonding unit 40 along a transfer rail RL.

Referring to FIGS. 1 and 2, the bonding apparatus 100 is an apparatus bonding component such as a flexible printed circuit board and a tape carrier package (TCP) on a flexible substrate PS. In the present embodiment, the flexible substrate PS may be a substrate having a flexible characteristic that allows it to be bent by an external force, such as a plastic substrate and a thin film metal substrate. However, the inventive concept is not limited to the characteristic of the substrate to which the bonding apparatus 100 bonds a component. For instance, the bonding apparatus 100 may be used to bond a component on a substrate not having a flexible characteristic, such as a glass substrate or a wafer.

In the present embodiment, the bonding apparatus 100 includes a substrate transfer unit 10, an anisotropic conductive film (ACF) providing unit 20, an auxiliary bonding unit 30, and a main bonding unit 40. The substrate transfer unit 10, the anisotropic conductive film (ACF) providing unit 20, the auxiliary bonding unit 30, and the main bonding unit 40 are received in one housing to be sequentially arranged on a worktable 5 in a first direction D1.

The substrate transfer unit 10 includes a stage SG, a rotation axis RA, a rotation drive part RD, a first drive part DR1, and a transfer rail RL. According to a configuration of the substrate transfer unit 10 described above, if the flexible substrate PS is provided to the substrate transfer unit 10, the substrate transfer unit 10 can transfer the flexible substrate PS to the ACF providing unit 20, the auxiliary bonding unit 30 and the main bonding unit 40.

The stage SG holds the flexible substrate PS in a stable position, for example by providing a surface on which the flexible substrate PS rests. A plurality of first suction parts may be formed in the stage SG. The plurality of first suction parts may be a plurality of suction holes (SH1 of FIG. 3) extending through the stage SG. The stage SG fixes a bottom surface of the flexible substrate PS in position using the first suction holes to make the flexible substrate PS stably fixed onto the stage SG.

One end of the rotation axis RA combines with a lower portion of the stage SG and the other end of the rotation axis RA combines with the rotation drive part RD. When the rotation axis RA is rotated by the rotation drive part RD, the stage SG may rotate with the rotation axis RA. Thus, regardless of a direction that the flexible substrate PS is provided to the stage SG, by driving the rotation drive part RD, the flexible substrate PS is easily controlled so that a pad part (PP of FIG. 3) of the flexible substrate PS points toward the main bonding unit 40.

The first drive part DR1 combines with the rotation drive part RD to move the stage SG in a second direction D2 which is a reverse direction of the first direction D1 along the transfer rail RL. Thus, by driving the first drive part DR1, the stage SG supporting the flexible substrate PS can move to the ACF providing unit 20, the auxiliary bonding unit 20 and the main bonding unit 40 and thereby each of the ACF providing unit 20, the auxiliary bonding unit 20 and the main bonding unit 40 can easily perform a predetermined process on the flexible substrate PS.

The ACF proving unit 20 provides an anisotropic conductive film (ACF of FIG. 3) onto the pad part PP of the flexible substrate PS. The anisotropic conductive film is a constituent element electrically connecting the pad part to the component DF and the anisotropic conductive film may include an adhesive material and conductive particles provided in the adhesive material. Thus, the anisotropic conductive film can adhere onto the pad part by the adhesive material of the anisotropic conductive film.

The auxiliary bonding unit 30 performs a temporary bonding process of temporarily bonding the anisotropic conductive film and the component DF provided on the pad part of the flexible substrate PS on the pad part. After the temporary bonding process is completed, the anisotropic conductive film and the component DF can be fixed to the pad part PP.

The main bonding unit 40 performs a main bonding process on the anisotropic conductive film and the component DF temporarily bonded on the pad part. The conductive particles of the anisotropic conductive film are compressed into the pad part and terminals of the component DF and thereby the flexible substrate PS and the component DF can be electrically connected to each other.

The temporary bonding process and the main bonding process may be performed in different process conditions. For example, the temporary bonding process may be performed at a temperature of from about 80° C. to about 120° C. and the main bonding process may be performed at a temperature of from about 250° C. to about 300° C. Although the temporary bonding process and the main bonding process may be performed under different process conditions, the auxiliary bonding unit 30 and the main bonding unit 40 may have a similar structure. Thus, in the interest of avoiding redundancy of description, the structure of the main bonding unit 40 is described, but a description of structure of the auxiliary bonding unit 30 is omitted in this disclosure.

Figure 3:
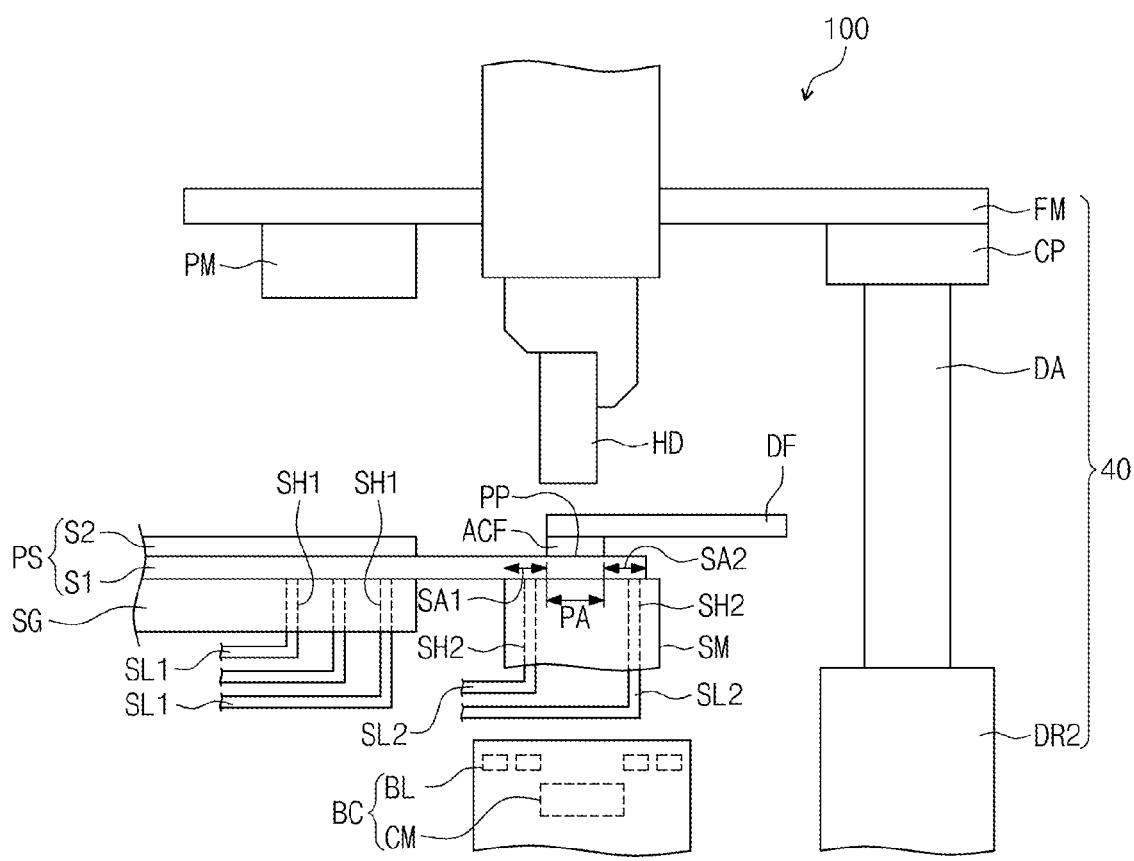
FIG. 3 is an enlarged view of a part of the side view illustrated in FIG. 2.
Figure 4:
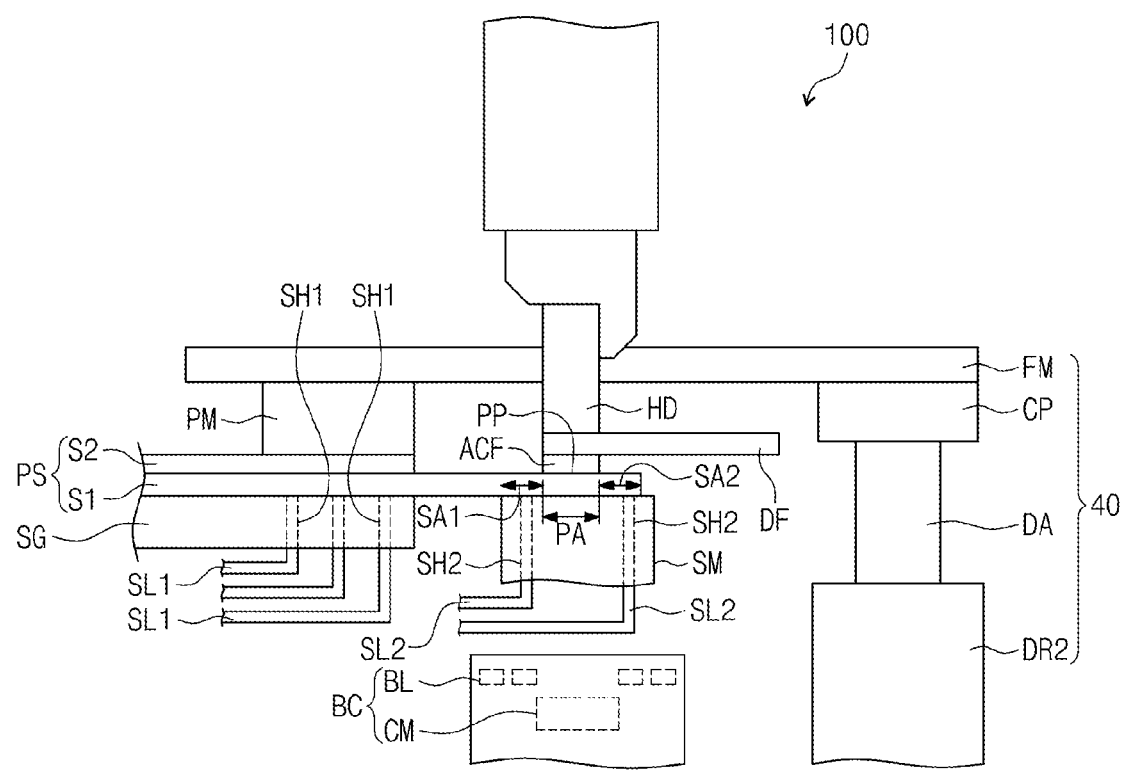
FIG. 4 is a drawing illustrating a main bonding unit performing a main bonding process.

FIG. 3 is an enlarged view of a part of the side view illustrated in FIG. 2. FIG. 4 is a drawing illustrating a main bonding unit 40 performing a main bonding process. FIGS. 3 and 4 illustrate a state where the stage SG has been moved to the main bonding unit 40 by the substrate transfer unit 10.

Referring to FIGS. 2, 3 and 4, the stage SG supports the flexible substrate PS. The flexible substrate PS may include a first substrate S1 and a second substrate S2 which face each other and are combined with each other. At least one of the first substrate S1 and the second substrate S2 may have a flexible characteristic such as a plastic substrate or a metal substrate of a thin film shape.

The stage SG may include a material having magnetic properties such as a stainless steel and a metal material in which gravitation occurs. A plurality of first suction holes SH1 extend through the stage SG and are connected to a plurality of first suction lines SL1, respectively. The plurality of first suction lines SL1 is connected to a vacuum generation unit VM. If the vacuum generation unit VM is driven, air is removed from the first suction lines SL1 and the first suction holes SH1, causing a bottom surface of the flexible substrate PS to be stably fixed onto the stage SG.

As shown in FIG. 2, the main bonding unit 40 includes a base BS, a photographing part BC, a support member SM, a second drive part DR2, a drive axis DA, a combination part CP, a frame FM, a push member PM and a compression member HD.

The base BS is fixed onto the work table 5 and the photographing part BC is disposed on the base BS. The photographing part BC includes a plurality of backlight BL and cameras CM. The plurality of backlights BL generates light to irradiate the support member SM and the camera CM shoots the pad part PP of the flexible substrate PS and terminals of the component DF on the pad part PP to generate image data. Thus, a worker can easily check an alignment state between the pad part PP and the terminals of the component DF using the image data.

The support member SM is disposed on the photographing part BC. The support member SM may include a material having a superior transmittance of light and a superior strength such as quartz. In this case, light generated from the plurality of backlights BL penetrates the support member SM to be used to shoot the pad part PP and the terminals of the component DF. The pad part PP and the component DF that adhere to each other across the anisotropic conductive film ACF from each other are provided on the support member SM.

A plurality of second suction parts may be formed in the support member SM. The plurality of second suction parts may be a plurality of suction holes SH2 extending through the support member SM. The plurality of second suction holes SH2 are connected to a plurality of second inhale lines SL2 respectively and the plurality of second suction lines SL2 is connected to the vacuum generation unit VM. If the vacuum generation unit VM is driven and thereby an external air is inhaled through the second suction lines SL2 and the second suction holes SH2, a bottom surface of the pad part PP can be stably fixed onto the support member SM.

If an area compressed by the compression member HD in the pad part PP is defined as a compression area PA, the area between the compression area PA and the closest outer edge of the first substrate S1 is defined as a first peripheral area SA1. The area on the other side of the compression area PA that is across the compression area PA from the first peripheral area SA1 is defined as a second peripheral area SA2. Neither the first peripheral area SA1 nor the second peripheral area SA2 is compressed by the compression member HD.

The same number of second suction holes SH2 may be disposed in the first peripheral area SA1 and the second peripheral area SA2. Thus, the pad part PP can be stably fixed to the support member SM by the suction power generated by the second suction holes SH2 in the first and second peripheral areas SA1 and SA2.

The second drive part DR2 is fixed to the base BS to combine with the drive axis DA. The drive axis DA performs a straight line motion in a direction perpendicular to the work table 5. One end of the frame FM combines with the drive axis DA by the combination part CP. The frame FM extends in a direction parallel to the work table 5, so that the other end of the frame FM is disposed on an upper side of the stage SG.

The push member PM combines with a bottom surface of the frame FM. The push member PM is moved up and down, driven by the second drive part DR2. If the frame FM is lowered by the second drive part DR2, the push member PM pushes the flexible substrate PS fixed onto the stage SG to more stably fix the flexible substrate PS onto the stage SG. The flexible substrate PS can maintain a flat state between the stage SG and the push member PM. This way, the main bonding unit 40 can more easily perform the main bonding process. For instance, an alignment between the pad part PP and the terminals of the component DF can be more easily performed and thereby the main bonding process can be more precisely performed.

The push member PM may include a material having magnetic properties. As described above, in the case that the stage SG includes a material such as a stainless steel, it can become easy to maintain the flexible substrate PS in a flat state using gravitation that occurs between the stage SG and the push member PM.

The compression member HD compresses the component DF provided on the support member SM into the pad part PP. The compression member HD combines with a third drive part DR3 moving the compression member HD close to or away from the support member SM, so that the compression member HD compresses the component DF into the pad part PP by a drive of the third drive part DR3 to perform the main bonding process. When the main bonding process is performed, as described above, the support member SM includes a material having a superior strength such as quartz to support pressure of the compression member HD.

Figure 5:
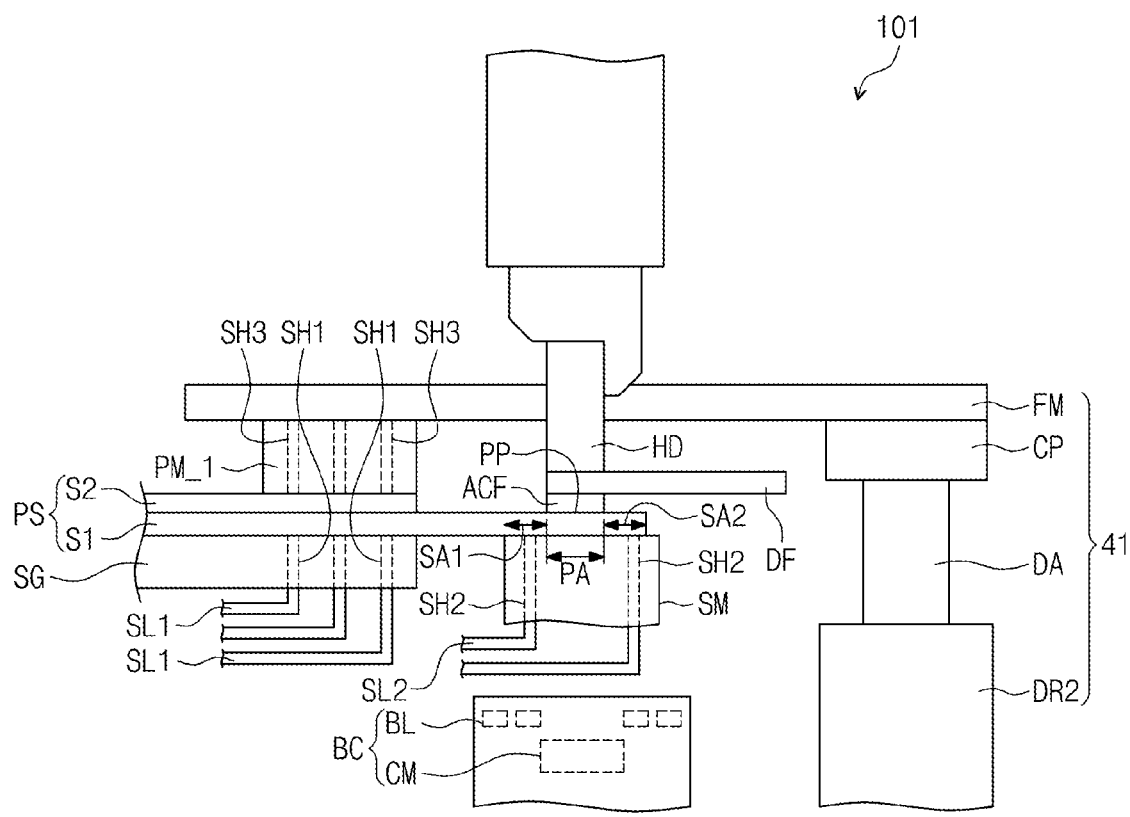
FIG. 5 is an enlarged view of a bonding apparatus in accordance with further embodiments of the inventive concept.

FIG. 5 is an enlarged view of a bonding apparatus in accordance with further embodiments of the inventive concept. A bonding apparatus 101 illustrated in FIG. 5 includes the same constituent elements as the bonding apparatus 100 described with reference to FIGS. 1 through 4 except a push member PM_1 of a main bonding unit 41. Overlapped descriptions of the constituent elements will be omitted.

Referring to FIG. 5, the bonding apparatus 101 includes the main bonding unit 41 and a plurality of third suction parts may be formed in the push member PM_1 of the main bonding unit 41. The plurality of third suction parts may be third suction holes SH3 extending through the push member PM_1. The plurality of third suction holes SH3 is connected to a plurality of third suction lines (not shown) respectively and the plurality of third suction lines is connected to a vacuum generation unit VM.

Thus, if the vacuum generation unit VM is driven and 1 air is removed through third suction lines and the third suction holes SH3, a top surface of the flexible substrate PS is fixed to the push member PM_1. Thus, a top surface of the flexible substrate PS is fixed to the stage SG by the plurality of first suction holes SH1 and a top surface of the flexible substrate PS may be adsorbed to the push member PM_1 by the third suction holes SH3. As a result, the flexible substrate PS can be more stably fixed to the push member PM_1 and the stage SG, and the flexible substrate PS can be more easily maintained in a flat, unwrinkled state.

When a bottom surface of the flexible substrate PS is fixed to the stage SG by a first vacuum generated by the plurality of first suction holes SH1, and a top surface of the flexible substrate PS is fixed to the push member PM_1 by a second inhalation force generated by the plurality of third suction holes SH3, the first inhalation force may be the same with the second inhalation force. Thus, the magnitudes of the force by which the top surface and the bottom surface of the flexible substrate PS are fixed becomes even, enhancing the flatness of the flexible substrate PS.

Figure 6:
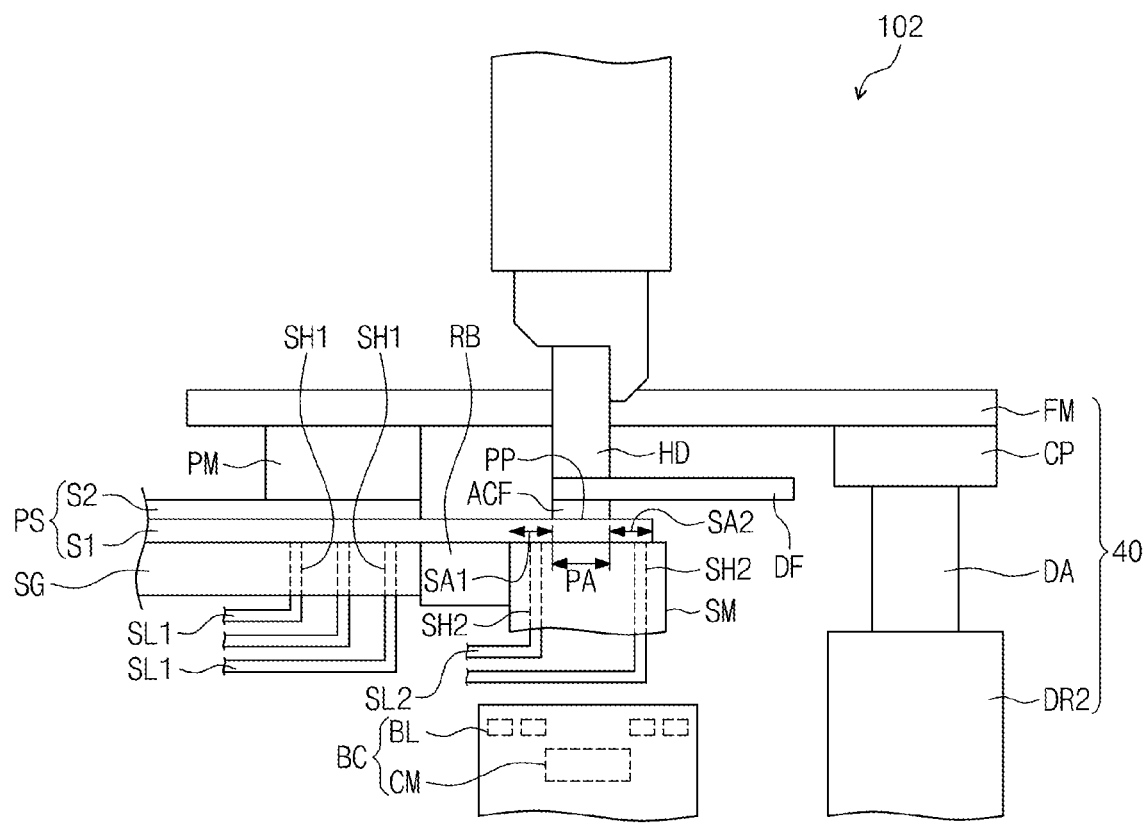
FIG. 6 is an enlarged view of a bonding apparatus in accordance with still further embodiments of the inventive concept.

FIG. 6 is an enlarged view of a bonding apparatus in accordance with still further embodiments of the inventive concept. A bonding apparatus 102 illustrated in FIG. 6 further includes an auxiliary support member RB unlike the bonding apparatus 100 described with reference to FIGS. 1 through 4.

Referring to FIG. 6, as described with reference to FIG. 1, since the stage SG performs a straight line motion in the first and second directions (D1, D2 of FIG. 1) by the substrate transfer unit (10 of FIG. 1), the stage SG is spaced apart from the support member SM not to interfere with each other when the straight line motion is performed. Instead, when viewed from the side, a top surface of the stage SG and a top surface of the support member SM are located at places having the same height. As described above, in the case that the stage SG and the support member SM are spaced apart from each other, so that a crack is generated between the stage SG and the support member SM, flatness of the flexible substrate PS disposed on the stage SG and the support member SM may be deteriorated at a location of the crack. To prevent the flatness of the flexible substrate PS from deteriorating at a location of the crack, the bonding apparatus includes the auxiliary support member RB disposed between the stage SG and the support member SM.

When viewed from the side, a top surface of the auxiliary support member RB may be placed collinearly with top surfaces of the stage SG and the support member SM. Thus, the auxiliary support member RB supports the stage SG to the support member SM, thereby preventing the flatness of the flexible substrate PS from deteriorating at a location of the crack.

The auxiliary support member RB may include silicon or a material having elasticity like rubber. Thus, the auxiliary support member RB can prevent the damage of the support member SM that may be caused by a collision between the stage SG and the support member SM. The bonding apparatus 120 may be advantageous in maintenance of its components.

Figure 7:
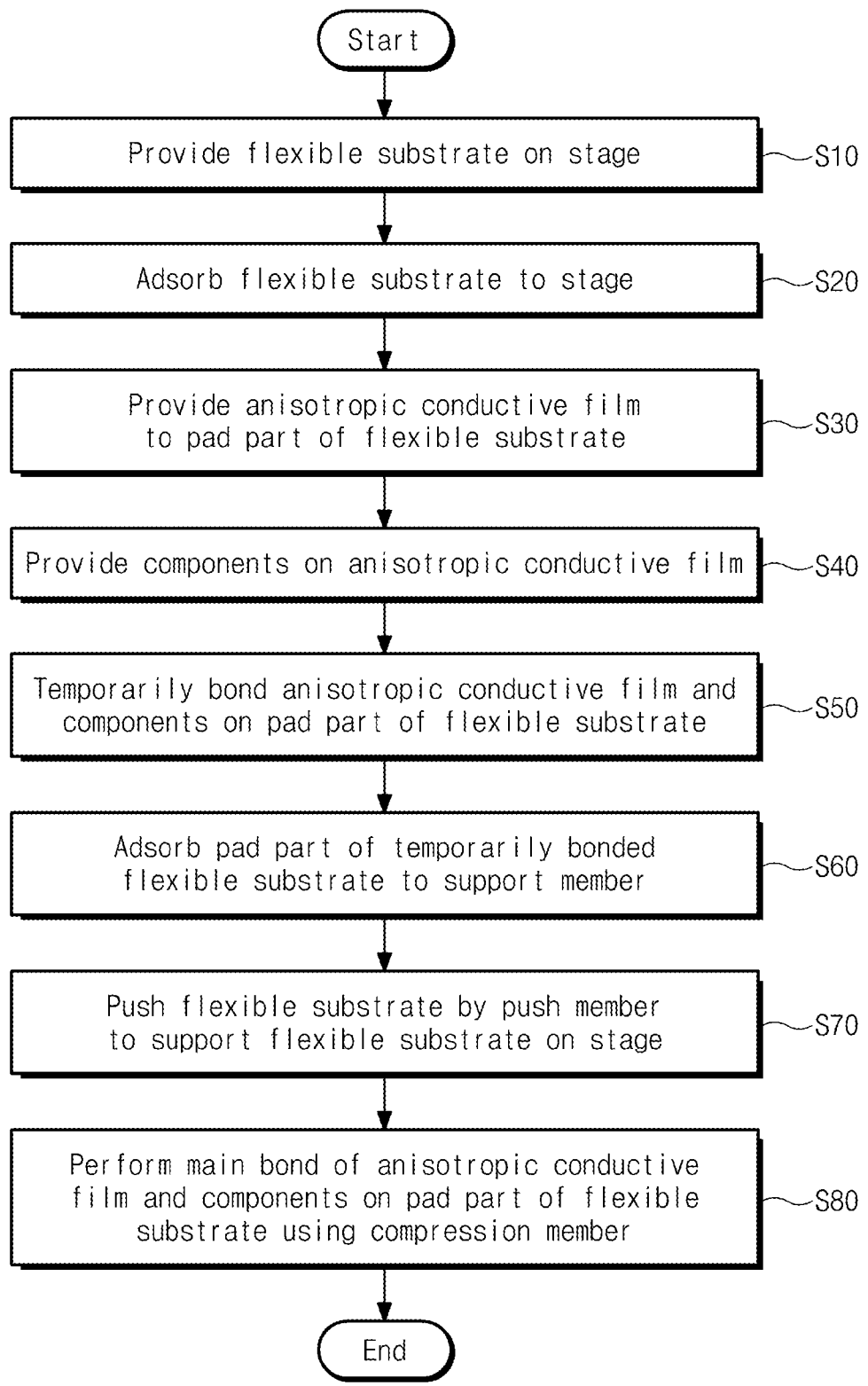
FIG. 7 is a process flow chart illustrating a method of bonding component on a flexible substrate using the bonding apparatus described with reference to FIGS. 1 through 4.

FIG. 7 is a process flow chart illustrating a method of bonding a component on a flexible substrate using the bonding apparatus described with reference to FIGS. 1 through 4.

Referring to FIGS. 1 through 4 and 7, the flexible substrate PS is provided on the stage SG (S10). The flexible substrate PS is provided on the stage SG with the substrate transfer unit 10 moved in the first direction D1 as far as possible.

After that, the flexible substrate PS is fixed to the stage SG using the plurality of first suction holes SH1 formed in the stage SG (S20). If the vacuum generation unit VM is driven and the air is removed through the first suction lines SL1 and the first suction holes SH1, a bottom surface of the flexible substrate PS can be stably fixed onto the stage SG.

The stage SG moves toward the ACF providing unit 20 by driving the substrate transfer unit 10 and the ACF providing unit 20 provides an anisotropic conductive film (ACF) to the pad part PP of the flexible substrate PS (S30). The stage SG moves toward the ACF providing unit 20 along the transfer rail RL by a drive of the first drive part DR1 of the substrate transfer unit 10, and then the ACF providing unit 20 provides the anisotropic conductive film (ACF) to the pad part PP. The anisotropic conductive film (ACF) fixes to the pad part PP by an adhesive force of the anisotropic conductive film (ACF).

To make the ACF providing unit 20 easily provide the anisotropic conductive film (ACF) to the pad part PP, the stage SG can be rotated by a drive of the rotation drive part RD so that the pad part PP heads for the ACF providing unit 20.

The stage SG moves toward the auxiliary bonding unit 30 by driving the substrate transfer unit 10, the component DF are provided onto the anisotropic conductive film (ACF) (S40) and the auxiliary bonding unit 30 performs the temporary bonding process temporarily bonding the anisotropic conductive film (ACF) and the component DF on the pad part PP (S50).

A process condition of the temporary bonding process being performed by the temporary bonding unit 30 may be different from a process condition of the main bonding process being performed by the main bonding unit 40. For instance, a process temperature and a bonding pressure of the temporary bonding process may be lower than those of the main bonding process. After the temporary bonding process is performed, the component DF are fixed onto the pad part PP with the anisotropic conductive film ACF between the component DF and the pad part PP.

By driving the substrate transfer unit 10, the stage SG moves to the main bonding unit 40 to provide the pad part PP of the flexible substrate PS supported on the stage SG onto the support member SM of the main bonding unit 40, and then the pad part PP is fixed to the support member SM using the plurality of second suction holes SH2 formed in the support member SM (S60). The same number of the second suction holes SH2 is disposed at the first peripheral area SA1 and the second peripheral area SA2, respectively, and thereby the pad part PP is stably fixed to the support member SM by substantially the same force at the first and second peripheral areas SA1 and SA2.

The flexible substrate PS is pushed by the push member PM to be supported on the stage SG (S70). The push member PM can be lowered toward the stage SG by driving the second drive part DR2, and flatness of the flexible substrate PS disposed between the stage SG and the push member PM may be improved by making the push member PM push the flexible substrate PS.

When the push member PM pushes the flexible substrate PS, a top surface of the flexible substrate PS can be concurrently fixed to the push member PM using the plurality of third suction holes SH3 formed in the push member PM. At this time, the bonding apparatus can be controlled so that the force by which a top surface of the flexible substrate PS is fixed to the push member PM is substantially the same as the force by which a bottom surface of the flexible substrate PS is fixed to the stage SG. As a result, flatness of the flexible substrate PS can be improved.

A main bonding process of compressing the component DF and the anisotropic conductive film (ACF) into the pad part PP is performed using the compression member PM (S80). The compression member PM can be lowered toward the support member SM by driving the third drive part DR3 and the compression member PM is heated to a predetermined temperature to easily bond the component DF on the pad part PP.

According to some embodiments of the inventive concept, when bonding a component on a flexible substrate, the flexible substrate can be maintained in a flat state. Thus, an alignment between a pad part of the flexible substrate and terminals of the component being bonded on the pad part can be achieved. Accordingly, a bonding process between the pad part and the terminals of the component is more precisely and easily performed and thereby process time and yield of the bonding process can be improved.

A push member supporting the flexible substrate on a stage may be formed of a material having magnetic properties and the stage can be formed of a metal material. In this case, while a bonding process is performed, the flexible substrate can be maintained in a flat state using gravitation being generated between the push member and the stage.

At least one third suction part can be formed in the push member. In this case, since the push member pushes the flexible substrate while adsorbing the flexible substrate, while a bonding process is performed, the flexible substrate can be maintained in a flat state.

The above-disclosed subject matter is to be considered illustrative, not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A bonding apparatus configured to bond a component to a substrate comprising:
    a stage holding the substrate in a fixed position using at least one first suction part formed in the stage;
    a push member pushing on the substrate against the stage and making contact with the substrate, the substrate being disposed between the stage and the push member;
    a support member fixing a pad part of the substrate using at least one second suction part formed in the support member; and
    a compression member compressing the component into the pad part that is fixed to the support member,
    wherein the support member has light transmittance properties, and the push member has magnetic properties sufficient to exert a magnetic force on the stage, the magnetic force causing the push member to gravitate towards the stage to maintain the substrate in a flat state.

2. The bonding apparatus of claim 1, wherein at least one third suction part is formed in the push member and the substrate is fixed to the push member by the third suction part.

3. The bonding apparatus of claim 2, wherein a bottom surface of the substrate is fixed to the stage by a first force generated by the first suction part, a top surface of the substrate is fixed to the push member by a second force generated by the third suction part, and the first and second forces have the same magnitude.

4. The bonding apparatus of claim 2, further comprising a vacuum generation unit connected to the first suction part, the second suction part and the third suction part,
    wherein the first suction part is a first suction hole extending through the stage, the second suction part is a second suction hole extending through the support member and the third suction part is a third suction hole extending through the push member, and
    wherein the vacuum generation unit removes air from the first through third suction holes.

5. The bonding apparatus of claim 1, wherein the substrate which the stage holds is a flexible substrate and, when viewed from the side, a top surface of the stage and a top surface of the support member are located at places having the same height and are spaced apart from each other.

6. The bonding apparatus of claim 5, further comprising:
an anisotropic conductive film (ACF) providing unit providing an anisotropic conductive film (ACF) to the pad part; and
a substrate transfer unit transferring the stage from the ACF providing unit to the support member and the compression member,
wherein the substrate transfer unit comprises:
    a rotation drive part combined with the stage to rotate the stage;
    a first drive part combined with the stage to transfer the stage from the ACF providing unit to the support member and the compression member; and
    a transfer rail guiding a transfer of the stage.

7. The bonding apparatus of claim 5, further comprising an auxiliary support member disposed between the stage and the support member to make contact with the stage and the support member.

8. The bonding apparatus of claim 7, wherein the auxiliary support member has elasticity and, when viewed from the side, a top surface of the auxiliary support member is located collinearly with top surfaces of the stage and the support member.

9. The bonding apparatus of claim 1, wherein the support member includes a quartz material.

10. The bonding apparatus of claim 1, further comprising:
a second drive part moving the push member close to or away from the stage; and
a third drive part moving the compression member close to or away from the support member.

11. The bonding apparatus of claim 1, further comprising a photographing part generating an image data of the substrate and the component, wherein the photographing part comprises:
a plurality of backlights generating light that passes through the support member; and
a camera photographing the substrate and the component.

* * * * *